United States Patent
Cha et al.

(10) Patent No.: US 10,246,133 B2
(45) Date of Patent: Apr. 2, 2019

(54) REAR VEHICLE BODY STRUCTURE

(71) Applicants: Hyundai Motor Company, Seoul (KR); Kia Motors Corporation, Seoul (KR)

(72) Inventors: Mun Soo Cha, Yeongtong-gu (KR); Yoonkyoung Han, Gwonseon-gu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 17 days.

(21) Appl. No.: 15/620,398

(22) Filed: Jun. 12, 2017

(65) Prior Publication Data
US 2018/0148097 A1    May 31, 2018

(30) Foreign Application Priority Data
Nov. 25, 2016 (KR) .......................... 10-2016-0158696

(51) Int. Cl.
| | |
|---|---|
| B62D 25/08 | (2006.01) |
| B62D 21/15 | (2006.01) |
| B62D 27/06 | (2006.01) |
| B62D 29/00 | (2006.01) |

(52) U.S. Cl.
CPC .......... B62D 21/152 (2013.01); B62D 25/08 (2013.01); B62D 27/065 (2013.01); B62D 29/008 (2013.01)

(58) Field of Classification Search
CPC ............................ B62D 21/152; B62D 25/08
USPC ........... 296/203.01–203.04, 193.08; 293/133
See application file for complete search history.

(56) References Cited

U.S. PATENT DOCUMENTS

| | | | | |
|---|---|---|---|---|
| 4,045,075 A | * | 8/1977 | Pulver .................... | B62D 21/08 280/798 |
| 4,660,345 A | * | 4/1987 | Browning .............. | B62D 21/08 164/63 |
| 6,139,094 A | * | 10/2000 | Teply ................... | B62D 23/005 296/203.03 |
| 7,665,800 B2 | * | 2/2010 | Werner .................. | B62D 33/02 296/183.1 |
| 8,196,696 B2 | | 6/2012 | Karube et al. | |
| 8,303,015 B2 | * | 11/2012 | Souma ................. | B62D 21/152 296/187.11 |
| 2002/0185892 A1 | * | 12/2002 | Rima ..................... | B62D 21/08 296/203.01 |
| 2004/0104601 A1 | * | 6/2004 | Durand ................ | B62D 23/005 296/203.01 |

(Continued)

FOREIGN PATENT DOCUMENTS

| | | |
|---|---|---|
| JP | 2004067082 A | 3/2004 |
| JP | 2011046242 A | 3/2011 |

*Primary Examiner* — Dennis H Pedder
(74) *Attorney, Agent, or Firm* — Slater Matsil, LLP (57) ABSTRACT

A rear vehicle body structure includes right/left side rear upper side members having ends respectively connected to right/left side center pillar members disposed at right/left sides along a width direction of a vehicle as well as being formed to extend along a height direction of a vehicle and a center pillar cross reinforcement member formed to extend along the width direction to connect the right/left side center pillar members, and disposed at the right/left sides along the width direction. A rear upper cross member is formed to extend along the width direction to connect the right/left side rear upper side members.

19 Claims, 10 Drawing Sheets

(56) References Cited

U.S. PATENT DOCUMENTS

2004/0113462 A1    6/2004  Winter et al.
2015/0210319 A1*   7/2015  Tiramani ............. B62D 21/183
                                                        280/756

* cited by examiner

REAR VEHICLE BODY STRUCTURE

CROSS-REFERENCE TO RELATED APPLICATIONS

This application claims priority to and the benefit of Korean Patent Application No. 10-2016-0158696 filed in the Korean Intellectual Property Office on Nov. 25, 2016, the entire contents of which are incorporated herein by reference.

TECHNICAL FIELD

The present invention relates to a rear vehicle body structure of a vehicle.

BACKGROUND

A so-called space frame vehicle body configuring a vehicle body by connecting vehicle body members of a conventional frame type includes a front vehicle body positioned at a front along a length direction the vehicle and configuring an engine room, a center vehicle body positioned at a center along the length direction of the vehicle and configuring a passenger room, and a rear vehicle body positioned at a rear along the length direction of the vehicle and configuring a trunk room.

The rear vehicle body of a midship vehicle in which the engine room is positioned at the rear along the length direction of the vehicle includes a rear side member extending along the length direction of the vehicle and disposed at right/left both sides along a width direction of the vehicle and a plurality of vehicle body members connected with a trust structure in a space between a roof of the vehicle and the rear side member.

In the rear vehicle body structure of the above-described space frame vehicle body, a development of the rear vehicle body structure having advantages of effectively responding to a rear crash accident, further stably protecting a fuel tank, and increasing a strength of the entire structure.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to a rear side member and a peripheral vehicle body structure. For example, embodiments can provide a rear vehicle body structure capable of improving a driving stability of the vehicle through an increasing of the strength in the rear vehicle body structure of the space frame type, further stably protecting the passenger by appropriately absorbing an impact when the rear crash accident is generated, and being firmly supported to an external input load.

A rear vehicle body structure according to an exemplary embodiment of the present invention may include right/left side rear upper side members having both ends respectively connected to right/left side center pillar members disposed at right/left sides along a width direction of a vehicle as well as being formed to extend along a height direction of a vehicle and a center pillar cross reinforcement member formed to extend along the width direction to connect the right/left side center pillar members, and disposed at the right/left sides along the width direction. A rear upper cross member can be formed to extend along the width direction to connect the right/left side rear upper side members.

Each of the right/left side rear upper side members may include a rear upper side front member disposed at a front along the length direction of the vehicle; a rear upper side center member disposed at a center and having one end connected to the rear upper side front member; and a rear upper side rear member disposed at a rear and having one end connected to the rear upper side center member.

The rear upper side front member may include both ends respectively connected to the center pillar member and the center pillar cross reinforcement member and one end connected to the rear upper side center member, thereby being formed of an entire "Y" shape.

The rear upper side front member and the rear upper side rear member may be formed to have a multi cross section or a closed cross section by using an extrusion method using an aluminum material.

The rear upper side center member may be molded by a die casting method using an aluminum material.

Right/left side rear lower side members disposed below the rear upper side member in the height direction, formed to extend in the length direction of the vehicle, and disposed at the right/left sides along the width direction may be further included; and the rear lower side member may be connected to the rear upper side member.

The right/left side rear lower side members may be connected to each other by a rear lower cross member formed to extend along the width direction.

The rear upper side member may be connected to the rear lower side member through a front connector member disposed at a front along the length direction and a rear connector member disposed at a rear; and the front connector member and the rear connector member may be respectively formed to extend in the height direction and disposed at the right/left sides.

A circular structure of a square shape may be formed by the right/left side rear upper side members, the rear upper cross member, the right/left side rear lower side members, the rear lower cross member, and the right/left side rear connector members.

The rear upper side center member may include a body plate entirely formed of a rectangular shape, an upper flange protruded outside in the width direction from an upper end edge of the body plate, and a lower flange protruded outside in the width direction of the vehicle from a lower end edge of the body plate.

Four bosses may be disposed with a predetermined interval along the length direction of the vehicle at the body plate, four bosses may be formed to be respectively protruded outside in the width direction of the vehicle; and an assemble nut may be engaged in a planted form or a screw tab is formed at four bosses; and an upper suspension arm may be engaged to the assemble nut or the screw tab.

A plurality of reinforcing ribs may be formed to radially extend based on each of the bosses; and a connection reinforcing boss connecting four bosses from a front boss positioned at a front along the length direction of the vehicle and a rear boss positioned at a rear to two center bosses disposed between the front boss and the rear boss into one may be formed among the plurality of reinforcing ribs.

The rear upper side rear member may include at least one closed box cross section; and the rear upper cross member coupled to a side surface of the rear upper side rear member may also include at least one closed box cross section.

A front coupling unit may be formed by the upper flange and the lower flange and front partition at a front part along the length direction of the rear upper side center member, thereby the rear upper side front member is inserted to the front coupling unit to be coupled; and a rear coupling unit may be formed by the upper flange and the lower flange and rear partition at a rear part along the length direction of the rear upper side center member, thereby the rear upper side rear member is inserted to the rear coupling unit to be coupled.

The lower flange may be recessed upwardly in the height direction near the front coupling unit to form a front lower coupling unit of a box shape, thereby the front connector member is inserted to the front lower coupling unit to be coupled; and the lower flange may be recessed upwardly in the height direction of the vehicle near the rear coupling unit to form a rear lower coupling unit of a box shape, thereby the rear connector member is inserted to the rear lower coupling unit to be coupled.

At least one rib may be formed to extend along the length direction and to be protruded downwardly at a lower surface of the lower flange and at least one rib may be also formed to extend in the length direction and to be protruded in an inside direction at an inside surface of the body plate.

The rear upper side front member and the front connector member may be disposed in a shape enclosing a fuel tank therebetween from an outside.

The rear upper cross member may be coupled to the rear upper side rear member, and a plurality of ribs to reinforce a strength of a coupling part with the rear upper cross member may be formed at an inside surface of the rear coupling unit of the rear upper side center member.

A plurality of ribs to reinforce a strength may be formed at an outside surface of the rear coupling unit of the rear upper side center member.

A reinforcing part of a shape covering a corner part may be provided at the corner part between the front coupling unit and the front lower coupling unit.

According to the rear vehicle body structure according to an exemplary embodiment of the present invention, the rear side member is configured of the rear upper side member and the rear lower side member, and the rear upper side member is configured of the rear upper side rear member absorbing the impact to be reduced when the rear crush accident is generated, the rear upper side center member supporting the rear suspension arm and a power train, and the rear upper side front member dispersing a load through a connection with the cabin and protecting the fuel tank, thereby planning the structure strength increasing and the rear crush impact dispersion effect.

The right/left side rear upper side members are connected to each other by the rear upper cross member, the right/left side rear lower side members are connected to each other by the rear lower cross member, and the rear lower side member and the rear lower cross member are connected to the rear upper side member and the rear upper cross member through the rear connector member, thereby forming the circular structure, accordingly, the structural strength of the rear vehicle body is effectively increased such that the power train may be mounted to be stably supported, and the twist strength of the rear vehicle body is increased such that the driving stability of the vehicle may be improved.

The rear upper side center member is connected to the rear upper suspension arm, and the radical rib is provided at the upper suspension arm coupling part such that the mounting strength of the rear upper suspension arm is increased, thereby effectively supporting an input load through the rear upper suspension arm.

The rear upper side rear member and the rear upper cross member are formed of the multi cross sections, thereby a load transmitting and dispersion may be effective and the twist strength may be increased.

The rear upper side center member is respectively connected to the front connector member, the rear connector member, the rear upper side front member, and the rear upper side rear member, and the reinforcing ribs are formed at the corner part of each coupling part of the members, thereby a moment force is reduced and the connection strength of each of the members may be increased.

The following reference symbols can be used in conjunction with the drawings:
10: center pillar member
20: rear upper side member
30: rear lower side member
40: rear upper cross member
50: rear lower cross member
60: front connector member
70: rear connector member
80: upper suspension arm
90: wheel
100: fuel tank

DETAILED DESCRIPTION OF ILLUSTRATIVE EMBODIMENTS

Hereafter, a front door device in a vehicle in accordance with an exemplary embodiment of the present invention will be described with reference to the attached illustrative drawings.

Figure 1:
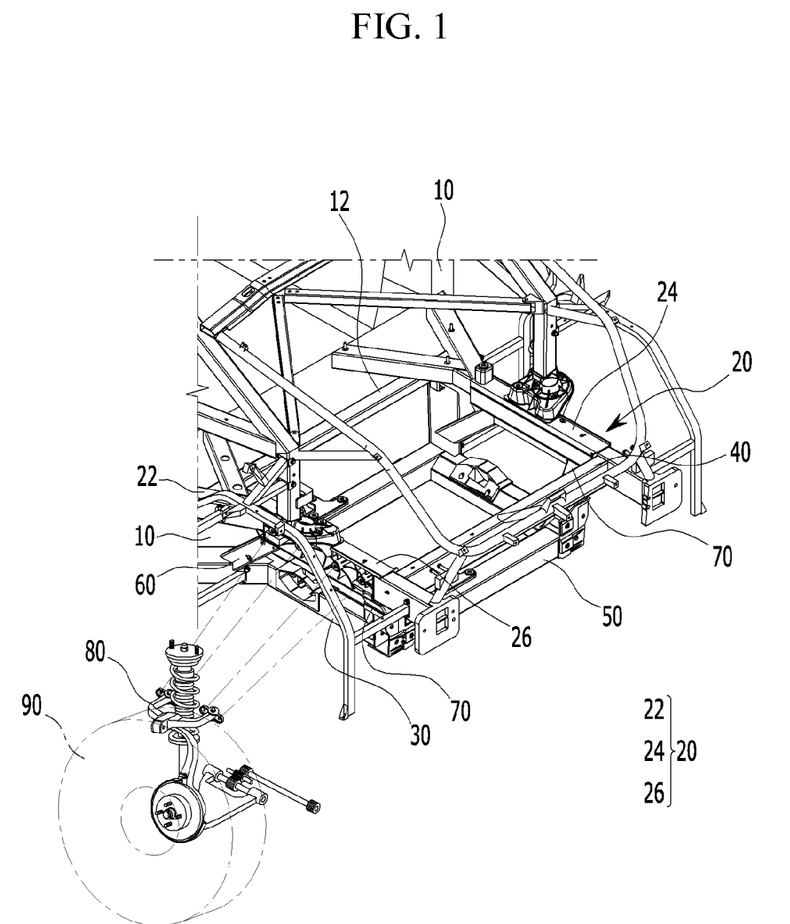
FIG. 1 is a perspective view of a rear vehicle body structure according to an exemplary embodiment of the present invention.

Referring to FIG. 1, a rear vehicle body structure according to an exemplary embodiment of the present invention as a frame type that vehicle body frame members are connected to each other means a vehicle body structure that is formed to extend along a height direction of a vehicle and is disposed at right/left sides along a width direction of the vehicle, thereby being formed along the length direction of the vehicle behind a center pillar member 10 forming a cabin skeleton.

The center pillar members 10 of the right/left sides are connected to each other by a center pillar cross reinforcement member 12 formed to extend along the width direction of the vehicle.

The rear vehicle body structure according to an exemplary embodiment of the present invention may include a rear upper side member 20 formed to extend along the length direction of the vehicle and disposed at the right/left sides along the width direction of the vehicle; and a rear lower side member 30 disposed in the height direction of the vehicle below the rear upper side member 20, formed to extend along the length direction of the vehicle, and disposed at the right/left sides along the width direction of the vehicle.

The rear upper side member 20 may be configured by being divided into a rear upper side front member 22 disposed at the front along the length direction of the vehicle, a rear upper side center member 24 disposed at the center, and a rear upper side rear member 26 disposed at the rear.

One of the rear upper side front member 22 may be connected to the center pillar cross reinforcement member 12, the other end of the rear upper side front member 22 may be connected to one end of the rear upper side center member 24, and the other end of the rear upper side center member 24 may be connected to one end of the rear upper side rear member 26.

The rear upper side members 20 of the right/left sides may be connected to each other by a rear upper cross member 40 formed to extend along the width direction of the vehicle.

The rear lower side members 30 of the right/left sides may be connected to each other by a rear lower cross member 50 formed to extend along the width direction of the vehicle.

The rear upper side front member 22 has an entire "Y" shape and includes two ends and one other end, one end of two ends is connected to the center pillar member 10, and the other end is connected to the center pillar cross reinforcement member 12.

The rear upper side front member 22 and the rear upper side rear member 26 may be formed to have a multiple cross section or a closed cross section through an extrusion method using an aluminum material.

The rear upper side center member 24 may be molded by a die casting method using the aluminum material.

The rear upper side member 20 may be connected to the rear lower side member 30 through a front connector member 60 disposed at the front along the length direction of the vehicle and a rear connector member 70 disposed at the rare.

The front connector member 60 and the rear connector member 70 may be respectively formed to extend along the height direction of the vehicle.

The front connector member 60 and the rear connector member 70 may be disposed at the right/left sides along the width direction of the vehicle.

Accordingly, a circular-shape structure of a square ("□") shape is entirely formed by the rear upper side members 20 of the right/left sides and the rear upper cross member 40 connecting them, the rear lower side members 30 of the right/left sides and the rear lower cross member 50 connecting them, and the rear connector member 70 of the right/left sides, thereby improving a rear crush corresponding performance of the vehicle.

Figure 2:
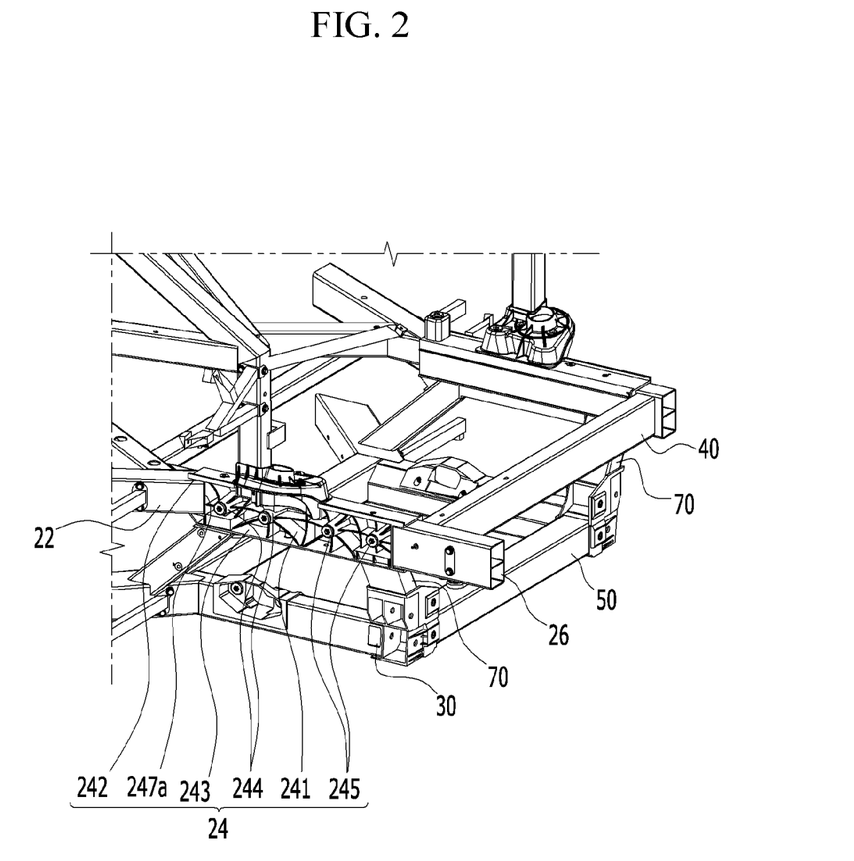
FIG. 2 is a perspective view of an essential part of a rear vehicle body structure according to an exemplary embodiment of the present invention.
Figure 3:
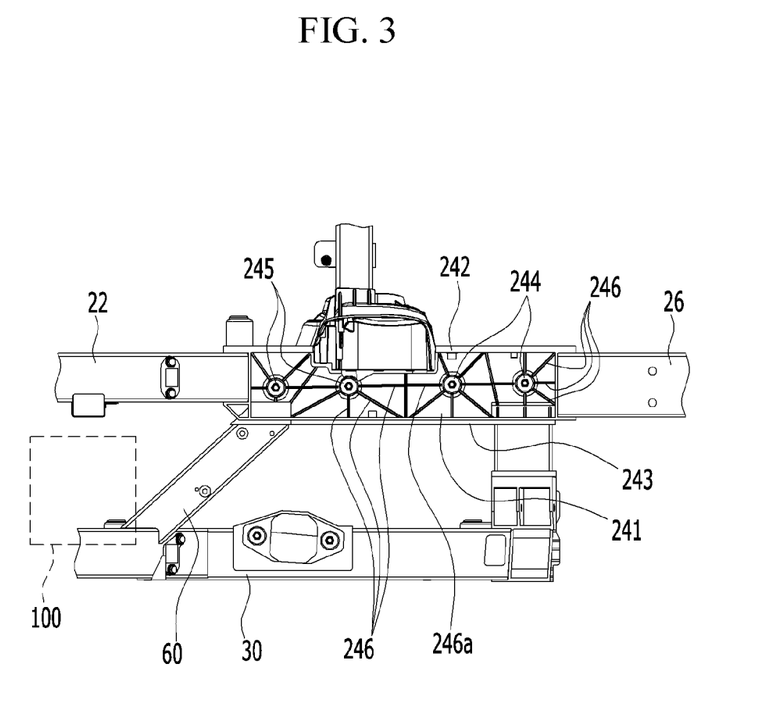
FIG. 3 is a side view of a rear vehicle body structure according to an exemplary embodiment of the present invention.

Referring to FIG. 2 and FIG. 3, the rear upper side center member 24 may include a body plate 241 entirely forming a rectangular shape, an upper flange 242 protruded outside in the width direction of the vehicle from an upper end edge of the body plate 241, and a lower flange 243 protruded outside in the width direction of the vehicle from a lower end edge of the body plate 241.

Four bosses 244 are disposed with a predetermined interval along the length direction of the vehicle at the body plate 241, and four bosses 244 may be respectively formed to be protruded outside in the width direction of the vehicle.

In each of four bosses 244, an assemble nut 245 may be engaged in a planted form or a screw tab may be directly formed.

Also, a plurality of reinforcing ribs 246 may be formed to radially extend base on each boss 244, and a connection reinforcing boss 246a connecting four bosses 244 into one from the front boss 244 positioned at the front along the length direction of the vehicle to the rear boss 244 positioned at the rear and two center bosses 244 positioned therebetween among the plurality of reinforcing ribs 246.

Four assemble nuts 245 may form two adjacent to each other into one pair to be distinguished into two pair assemble nuts, two both ends of the upper suspension arm 80 may be engage to two pair assemble nuts, and the other end of the upper suspension arm 80 may be engaged to the wheel 90. (Referring to FIG. 1)

Accordingly, the wheel 90 may be supported to the rear upper side center member 24 through the upper suspension arm 80, that is, the rear vehicle body.

Also, the reinforcing ribs 246 increase a peripheral strength of the boss 244 to which the upper suspension arm 80 is engaged to further stably support the upper suspension arm 80, thereby improving the driving stability of the vehicle.

Figure 4:
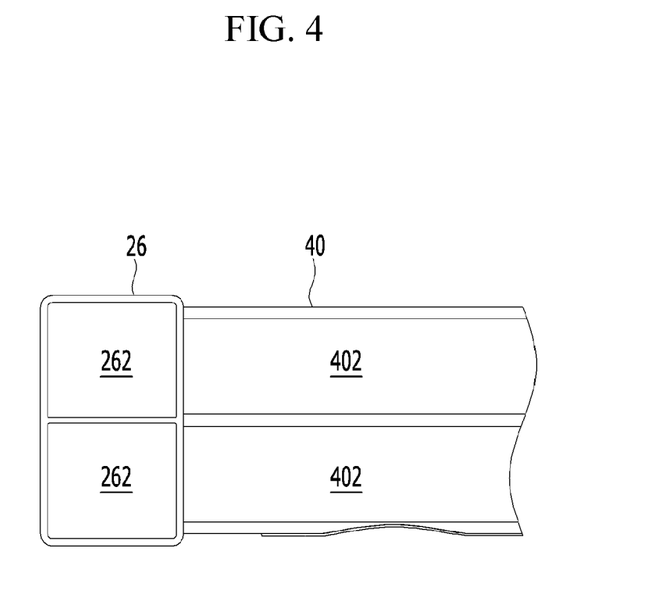
FIG. 4 is a cross-sectional view of a rear upper side rear member and a rear upper cross member according to an exemplary embodiment of the present invention.

Referring to FIG. 4, the rear upper side rear member 26 may further include one or two closed box cross sections 262 vertically disposed, and the rear upper cross member 40 coupled to the side surface of the rear upper side rear member 26 may also include one or two closed box cross sections 402, thereby increasing a twist strength of the rear vehicle body and planning an effective load distribution.

Figure 5:
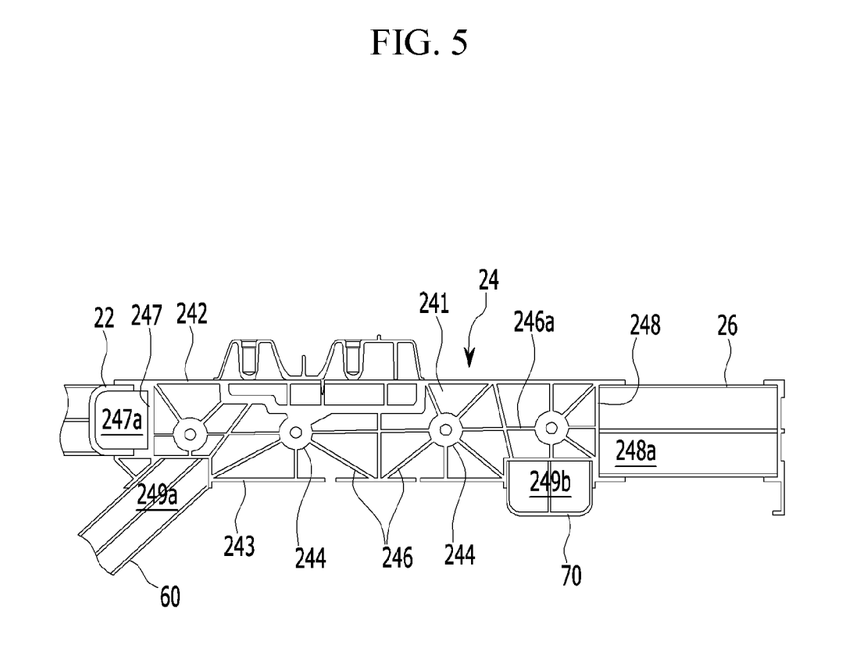
FIG. 5 is a cross-sectional view of a rear upper side member according to an exemplary embodiment of the present invention.

Referring to FIG. 2 and FIG. 5, a front coupling unit 247a is formed by an upper flange 242, a lower flange 243, and the front partition 247 at the front part according to the length direction of the vehicle of the rear upper side center member 24, thereby the rear upper side front member 22 is inserted to the front coupling unit 247a to be coupled, and a rear coupling unit 248a is also formed by the upper flange 242, the lower flange 243, and the rear partition 248 at the rear part according to the length direction of the vehicle of the rear upper side center member 24, thereby the rear upper side rear member 26 is inserted to the rear coupling unit 248a to be coupled.

Also, the lower flange 243 may be recessed upwardly in the height direction of the vehicle near the front coupling unit 247a to form a front lower coupling unit 249a of the box shape, the front connector member 60 may be inserted to the front lower coupling unit 249a to be coupled, the lower flange 243 may be recessed upwardly in the height direction of the vehicle near the rear coupling unit 248a to form the rear lower coupling unit 249b of the box shape, and the rear connector member 70 may be inserted to the rear lower coupling unit 249b to be coupled.

The above coupling units and the structure that the members are inserted thereto to be coupled may increase a coupling strength between the rear upper side center member 24 and the members 22, 26, 60, and 70.

Figure 6:
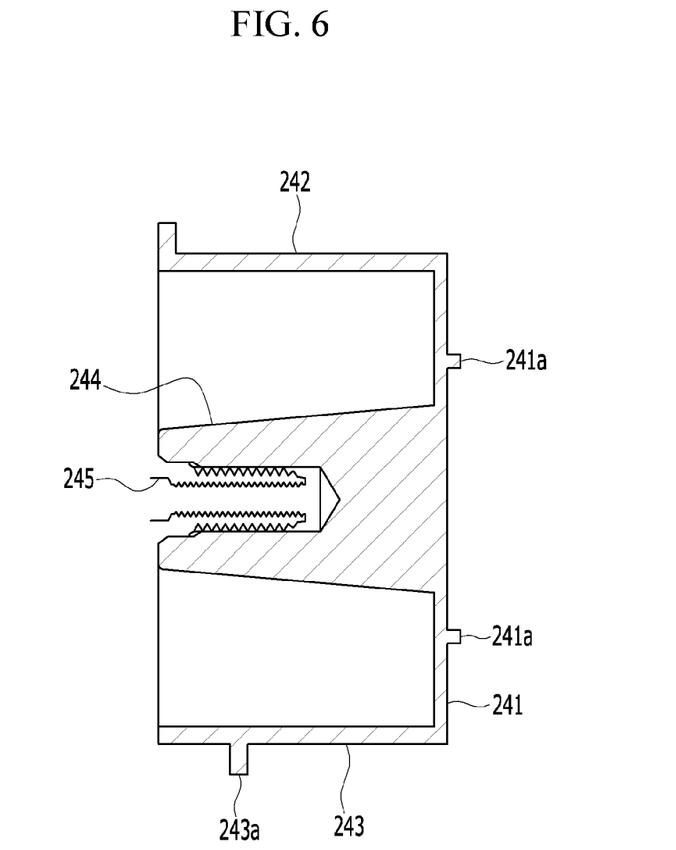
FIG. 6 is a cross-sectional view of a rear upper side center member according to an exemplary embodiment of the present invention.
Figure 8:
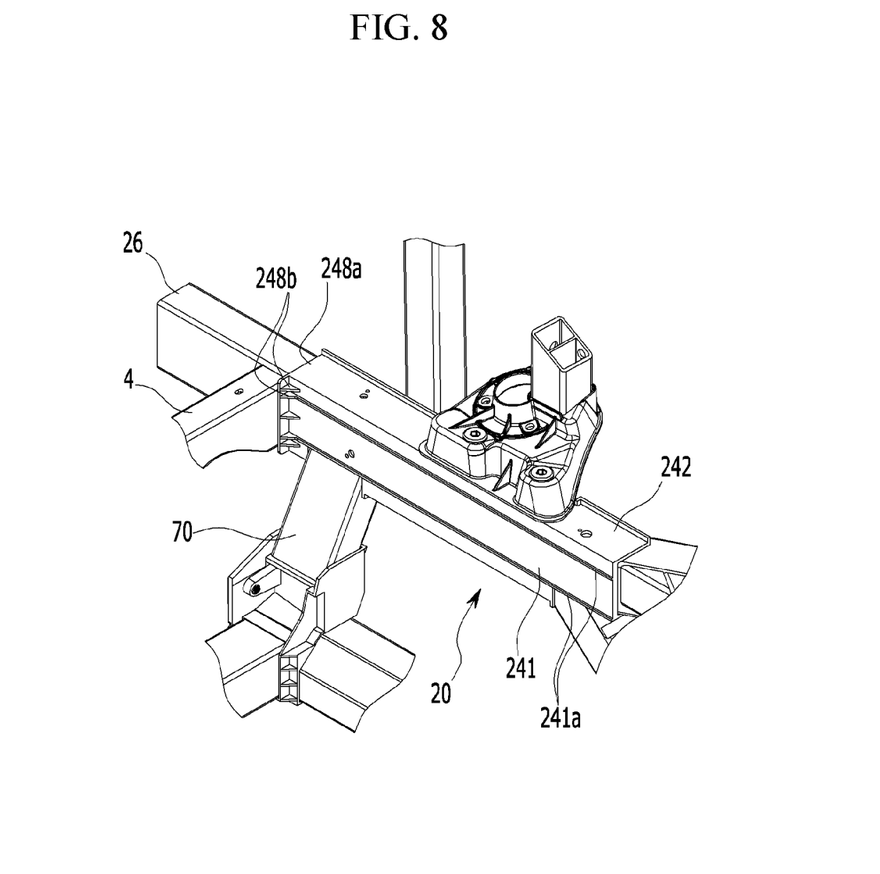
FIG. 8 is a perspective view of a rear upper side center member according to an exemplary embodiment of the present invention.

Referring to FIG. 6 and FIG. 8, at least one rib 243a is formed to extend along the length direction and to be protruded downward at a lower surface of the lower flange 243, and at least one rib 241a is also formed to extend along the length direction and to be protruded in an inside direction at an inside surface of the body plate 241, thereby increasing a buckling strength of the rear upper side center member 24.

Figure 7:
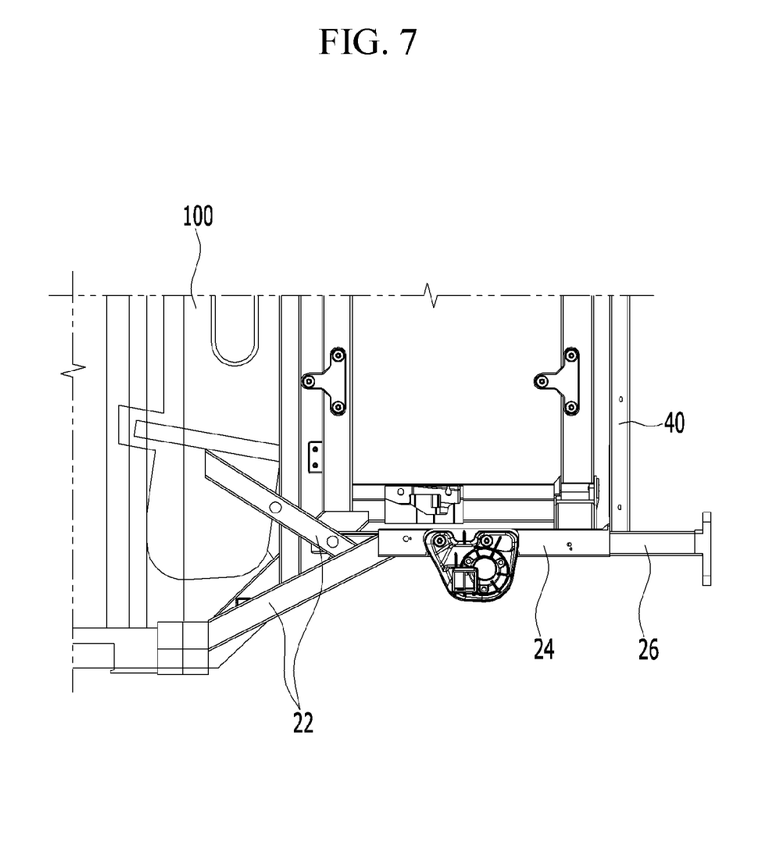
FIG. 7 is a top plan view of a rear vehicle body structure according to an exemplary embodiment of the present invention.

Referring to FIG. 3 and FIG. 7, the rear upper side front member 22 and the front connector member 60 are disposed in a shape enclosing the fuel tank 100 positioned therebetween from the outside to appropriately protect the fuel tank 100 when an external collision or crush accident occurs, thereby preventing a fire depending on a fuel leakage due to a damage of the fuel tank 100.

Referring to FIG. 8, a plurality of ribs 248b to reinforce the strength is formed at the inside surface of the rear coupling unit 248a of the rear upper side center member 24, when the rear upper cross member 40 is coupled to the inside surface of the rear upper side rear member 26 coupled to the rear coupling unit 248a, the plurality of ribs 248b reinforces the strength at the coupling part.

Figure 9:
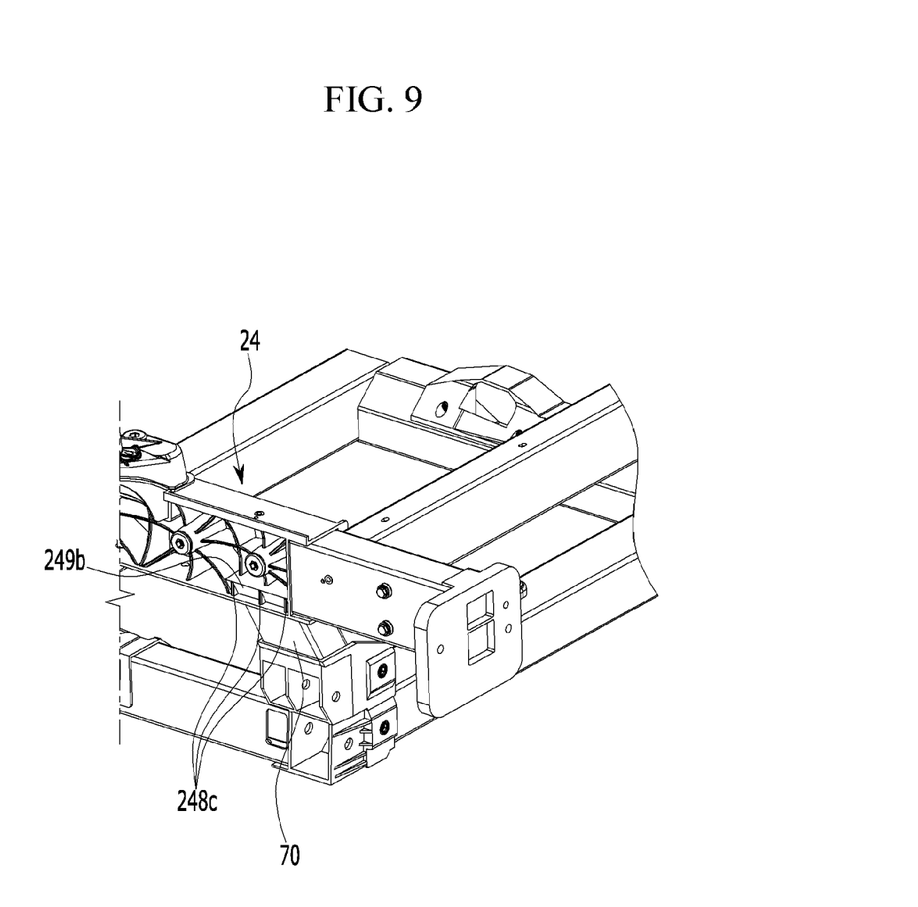
FIG. 9 is an enlarged perspective view of a rear part of a rear upper side center member according to an exemplary embodiment of the present invention.

Referring to FIG. 9, a plurality of ribs 248c to reinforce the strength is formed at the outside surface of the rear lower coupling unit 249b of the rear upper side center member 20, when the rear connector member 70 is coupled to the rear upper side center member 24, the plurality of ribs 248c reinforces the strength at the coupling part.

Figure 10:
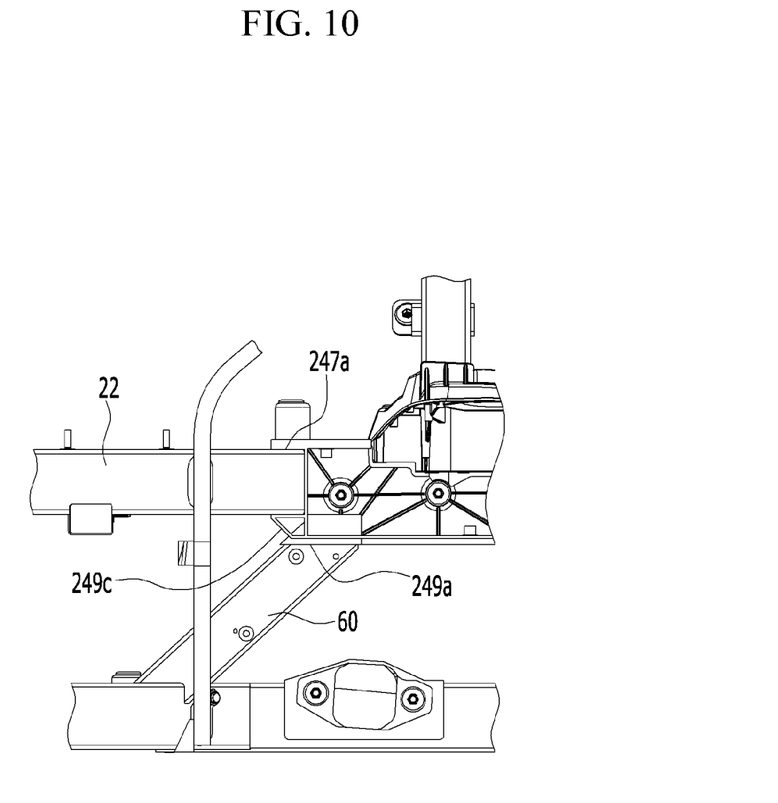
FIG. 10 is an enlarged side view of a front part of a rear upper side center member according to an exemplary embodiment of the present invention.

Referring to FIG. 10, a reinforcing pat 249c of a shape covering a corner part is also provided at the corner part between the front coupling unit 247a and the front lower coupling unit 249a.

As the reinforcing ribs or the reinforcing parts are formed at the part where each of the members is connected to such a rear upper side center member 24, the connection strength between the rear upper side center member 24 and the members connected thereto may be increased, and an entering of a welding gun may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rear vehicle body structure comprising:
   right/left side rear upper side members having ends respectively connected to right/left side center pillar members disposed at right/left sides along a width direction of a vehicle as well as being formed to extend along a height direction of a vehicle and a center pillar cross reinforcement member formed to extend along the width direction to connect the right/left side center pillar members, and disposed at the right/left sides along the width direction; and
   a rear upper cross member formed to extend along the width direction to connect the right/left side rear upper side members;
   wherein each of the right/left side rear upper side members includes:
      a rear upper side front member disposed at a front along the length direction of the vehicle;
      a rear upper side center member disposed at a center and having one end connected to the rear upper side front member; and
      a rear upper side rear member disposed at a rear and having one end connected to the rear upper side center member.

2. The rear vehicle body structure of claim 1, wherein the rear upper side front member includes two ends respectively connected to the center pillar member and the center pillar cross reinforcement member and one end connected to the rear upper side center member, thereby being formed of an entire "Y" shape.

3. The rear vehicle body structure of claim 1, wherein the rear upper side front member and the rear upper side rear member is formed to have a multi cross section or a closed cross section by using an extrusion method using an aluminum material.

4. The rear vehicle body structure of claim 1, wherein the rear upper side center member is molded by a die casting method using an aluminum material.

5. The rear vehicle body structure of claim 1, further comprising:
   right/left side rear lower side members disposed below the rear upper side member in the height direction, formed to extend in the length direction of the vehicle, and disposed at the right/left sides along the width direction; and
   the rear lower side member is connected to the rear upper side member.

6. The rear vehicle body structure of claim 5, wherein the right/left side rear lower side members are connected to each other by a rear lower cross member formed to extend along the width direction.

7. The rear vehicle body structure of claim 5, wherein:
   the rear upper side member is connected to the rear lower side member through a front connector member disposed at a front along the length direction and a rear connector member disposed at a rear; and
   the front connector member and the rear connector member are respectively formed to extend in the height direction and disposed at the right/left sides.

8. The rear vehicle body structure of claim 7, wherein a circular structure of a rectangular shape is formed by the right/left side rear upper side members, the rear upper cross member, the right/left side rear lower side members, a rear lower cross member formed to extend along the width direction, and right/left side rear connector members.

9. The rear vehicle body structure of claim 7, wherein the rear upper side center member includes:
   a body plate entirely formed of a rectangular shape;
   an upper flange protruded outside in the width direction from an upper end edge of the body plate; and
   a lower flange protruded outside in the width direction of the vehicle from a lower end edge of the body plate.

10. The rear vehicle body structure of claim 9, wherein:
   four bosses are disposed with a predetermined interval along the length direction of the vehicle at the body plate;
   four bosses are formed to be respectively protruded outside in the width direction of the vehicle;
   an assemble nut is engaged in a planted form or a screw tab is formed at four bosses; and
   an upper suspension arm is engaged to the assemble nut or the screw tab.

11. The rear vehicle body structure of claim 10, wherein:
   a plurality of reinforcing ribs is formed to radially extend based on each of the bosses; and a connection reinforcing boss is formed by connecting four bosses, the four bosses including a front boss positioned at a front along the length direction of the vehicle, a rear boss positioned at a rear, and two center bosses disposed between the front boss and the rear boss, the four bosses being connected into one boss that is formed among the plurality of reinforcing ribs.

12. The rear vehicle body structure of claim 9, wherein:
the rear upper side rear member includes a closed box cross section; and
the rear upper cross member coupled to a side surface of the rear upper side rear member also includes a closed box cross section.

13. The rear vehicle body structure of claim 9, wherein a rib is formed to extend along the length direction and to be protruded downwardly at a lower surface of the lower flange and a second rib is formed to extend in the length direction and to be protruded in an inside direction at an inside surface of the body plate.

14. The rear vehicle body structure of claim 9, wherein the rear upper side front member and the front connector member are disposed in a shape enclosing a fuel tank therebetween from an outside.

15. The rear vehicle body structure of claim 9, wherein:
a front coupling unit is formed by the upper flange and the lower flange and front partition at a front part along the length direction of the rear upper side center member, thereby the rear upper side front member is inserted to the front coupling unit to be coupled; and
a rear coupling unit is formed by the upper flange and the lower flange and rear partition at a rear part along the length direction of the rear upper side center member, thereby the rear upper side rear member is inserted to the rear coupling unit to be coupled.

16. The rear vehicle body structure of claim 15, wherein:
the lower flange is recessed upwardly in the height direction near the front coupling unit to form a front lower coupling unit of a box shape, thereby the front connector member is inserted to the front lower coupling unit to be coupled; and
the lower flange is recessed upwardly in the height direction of the vehicle near the rear coupling unit to form a rear lower coupling unit of a box shape, thereby the rear connector member is inserted to the rear lower coupling unit to be coupled.

17. The rear vehicle body structure of claim 16, wherein a reinforcing part of a shape covering a corner part is provided at the corner part between the front coupling unit and the front lower coupling unit.

18. The rear vehicle body structure of claim 15, wherein:
the rear upper cross member is coupled to the rear upper side rear member; and
a plurality of ribs to reinforce a strength of a coupling part with the rear upper cross member is formed at an inside surface of the rear coupling unit of the rear upper side center member.

19. The rear vehicle body structure of claim 15, wherein a plurality of ribs to reinforce strength is formed at an outside surface of the rear coupling unit of the rear upper side center member.

* * * * *